(12) United States Patent
Shuster

(10) Patent No.: US 6,736,404 B1
(45) Date of Patent: May 18, 2004

(54) SHAFT FOR USE WITH ANNULAR SEAL ASSEMBLY AND METHOD OF MANUFACTURING SAME

(75) Inventor: Mark Shuster, Toledo, OH (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/706,232

(22) Filed: Nov. 4, 2000

Related U.S. Application Data
(60) Provisional application No. 60/163,531, filed on Nov. 4, 1999.

(51) Int. Cl.$^7$ ................................................ F16J 15/32
(52) U.S. Cl. ........................................ 277/559; 82/1.11
(58) Field of Search ................................ 464/179, 183; 277/559; 82/1.11, 902; 29/DIG. 23; 72/703

(56) References Cited

U.S. PATENT DOCUMENTS

| | | | |
|---|---|---|---|
| 2,273,967 A | * | 2/1942 | Leech ...................... 72/703 X |
| 3,515,395 A | | 6/1970 | Weinard |
| 3,572,730 A | * | 3/1971 | Otto et al. ............... 277/559 X |
| 3,586,340 A | | 6/1971 | Otto et al. |
| 3,586,342 A | | 6/1971 | Staab |
| 3,929,341 A | * | 12/1975 | Clark ......................... 277/559 |
| RE30,223 E | * | 3/1980 | Prescott et al. |
| 4,573,690 A | * | 3/1986 | DeHart et al. ........... 277/559 X |
| 4,667,546 A | * | 5/1987 | Dombrowski et al. ........ 82/104 |
| 4,899,863 A | * | 2/1990 | Settles .................... 29/DIG. 23 |
| 4,969,653 A | * | 11/1990 | Breen |
| 5,044,642 A | * | 9/1991 | Vogt et al. .................. 277/559 |
| 5,190,002 A | * | 3/1993 | Wietig |
| 5,195,757 A | | 3/1993 | Dahll |
| 5,921,555 A | * | 7/1999 | Johnston ..................... 277/559 |
| 6,159,554 A | * | 12/2000 | Kloft et al. |

FOREIGN PATENT DOCUMENTS

| CA | 715294 | * | 8/1965 | ................... 72/703 |

OTHER PUBLICATIONS

"A Friction–Reducing Shaft Surface For Use With Standard Radial Sharp Lip Oil Seals", SAE Technical Paper No. 810201, dated Feb. 23–27, 1981.

(List continued on next page.)

*Primary Examiner*—Greg Binda
(74) *Attorney, Agent, or Firm*—MacMillan, Sobanski & Todd, LLC

(57) ABSTRACT

A structure and method of manufacturing an outer surface of a shaft avoids the creation of a preferential lead and thereby minimizes leakage through an annular seal assembly when such shaft is rotated or otherwise moved relative thereto during use. The outer circumferential surface of the shaft is formed having a plurality of relatively small irregularities that are evenly distributed thereabout. Such irregularities may be defined by relatively higher portions and relatively lower portions that are formed in an intersecting, cross hatched pattern or in a circumferentially extending undulating or oscillating pattern. To form the cross hatched pattern, an apparatus can be operated to engage the outer circumferential surface of the shaft in two sequential passes in opposite axial directions while the shaft is being rotated. To form the undulating pattern, an apparatus can be operated to engage the outer circumferential surface of the shaft in an axially reciprocating manner while the shaft is being rotated. By varying the feed rate of the apparatus, the rotational speed of the shaft, and the magnitude of the force applied by the apparatus against the outer circumferential surface of the shaft, the size, shape, and depth of the surface irregularities can be varied as desired.

15 Claims, 5 Drawing Sheets

OTHER PUBLICATIONS

"A Quantitative Evaluation Of The Effects Of Shaft Lead And Hydrodynamic Flutes Upon Radial Lip Seal Performance", SAE Technical Paper No. 890995, dated Apr. 11, 1989.

"The Sealing Performance Of Elastomer Rotary Lip Seals On Turned Shafts", SAE Technical Paper No. 980584 dated Feb. 23, 1998.

"Detection & Quantification Of Lead For Ground Shafts Used In Radial Lip Sealing Systems", Federal Mogul, dated Jan. 27, 1994.

"Shaft Finishing Techniques For Radial Lip Type Shaft Seals", Rubber Manufacturers Association, dated 1985, pp. 18–20.

"Laboratory Simulation To Select Oil Seal And Surface Treatment" Wear publication, dated 1999, pp. 954–960.

* cited by examiner

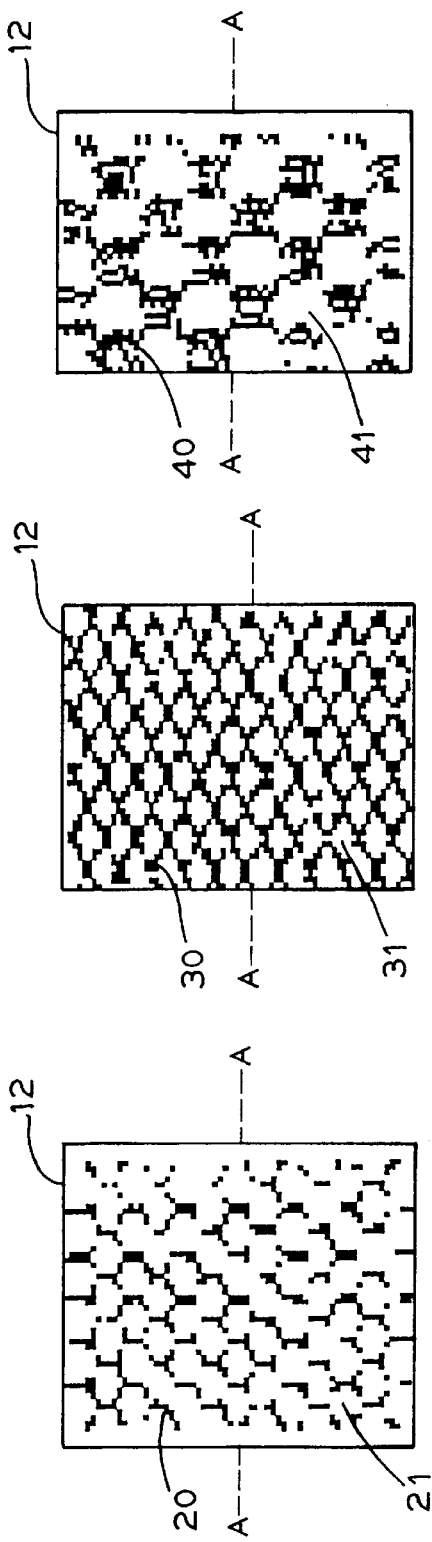
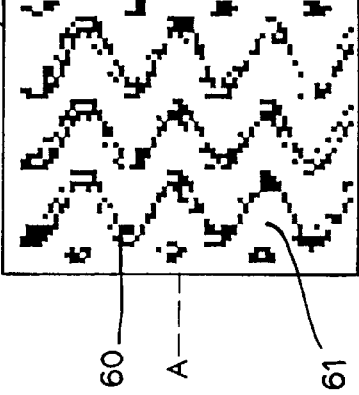
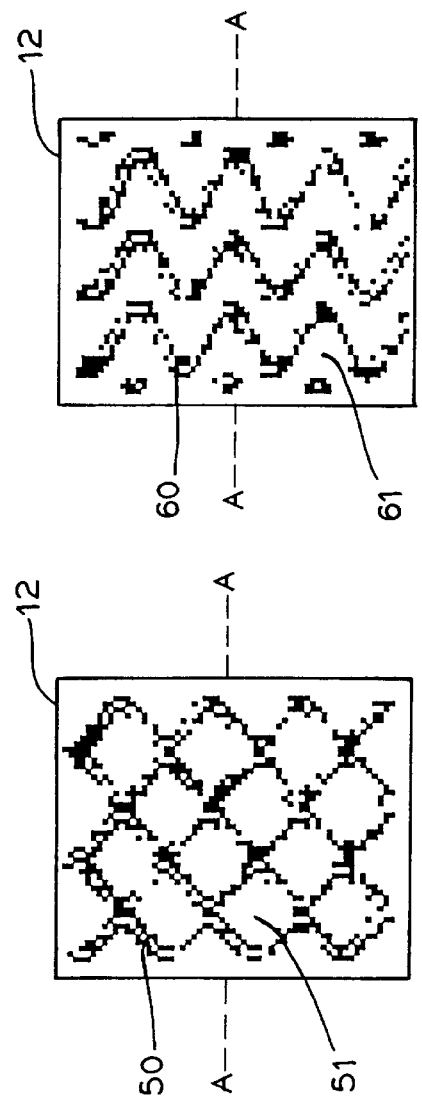

SHAFT FOR USE WITH ANNULAR SEAL ASSEMBLY AND METHOD OF MANUFACTURING SAME

CROSS REFERENCE TO RELATED APPLICATION

This application claims the benefit of U.S. Provisional Application No. 60/163,531, filed Nov. 4, 1999, the disclosure of which is incorporated herein by reference.

BACKGROUND OF THE INVENTION

This invention relates in general to annular seal assemblies that resiliently engage the outer surfaces of shafts to prevent the passage of oil or other liquids therethrough. In particular, this invention relates to an improved structure and method of manufacturing an outer surface of such a shaft that minimizes leakage through the annular seal assembly when such shaft is rotated or otherwise moved relative thereto during use.

In many mechanical devices, two or more components are supported within a housing for movement relative to one another. It is well known that when any of these components engage one another during such relative movement, friction causes undesirable heat and wear to occur. To minimize the adverse effects of such friction, it is often desirable to provide a quantity of lubricant within the housing. By providing the lubricant on the engaging surfaces of the relatively moving components, the amount of friction that is generated during operation is reduced, thereby prolonging the useful lifespan of the device.

In some instances, it is necessary or desirable that one or more of the components extend outwardly from the housing of the device so as to engage or be engaged by an ancillary structure. For example, a cylindrical shaft may extend outwardly through a bore formed through the housing of the device so as to rotatably drive (or, alternatively, be rotatably driven by) the ancillary structure. In these instances, it is usually necessary to provide a seal between the housing and the shaft to retain the lubricant within the housing and to prevent dirt, water, and other contaminants from entering into the housing.

One well known structure for providing such a seal is an annular seal assembly. A typical annular seal assembly includes a rigid outer annular case having a resilient inner seal secured thereto. The rigid outer case is press fit within the bore formed through the housing of the device and provides a fluid-tight seal therebetween. The resilient inner seal includes a flexible lip portion that extends radially inwardly into sealing engagement with an outer surface of the shaft extending therethrough. If desired, a garter spring or other biasing mechanism can be provided to positively urge the flexible lip portion into sealing engagement with the outer surface of the shaft. In either event, the lip portion of the resilient inner seal engages the outer surface of the shaft to retain the lubricant within the housing and to prevent dirt, water, and other contaminants from entering into the housing, regardless of movement of the shaft (such as rotational or reciprocating movement) relative to the housing.

Ideally, the outer circumferential surface of the shaft would be formed having a plurality of relatively small irregularities that are evenly distributed thereabout. Such irregularities can be characterized as being either relatively higher portions (i.e., small hills in the outer circumferential surface of the shaft that extend above the desired outer diameter thereof) or relatively lower portions (i.e., small valleys in the outer circumferential surface of the shaft that extend below the desired outer diameter thereof). The presence of these hills and valleys is desirable because small amounts of lubricant are trapped in the valleys during use. The trapped lubricant reduces the amount of friction between the outer circumferential surface of the shaft and the flexible lip portion of the resilient inner seal engaged therewith. So long as such surface irregularities are relatively small in size and sufficiently evenly distributed across the outer circumferential surface of the shaft, then their presence will not likely adversely affect the operation of the annular seal assembly.

However, as a practical matter, the processes used to manufacture the shaft have not been sufficiently controlled in the past to insure that size and distribution of these surface irregularities would not adversely affect the operation of the annular seal assembly. Thus, the outer circumferential surface of the shaft is rarely formed having such relatively small and evenly distributed surface irregularities. On the contrary, the outer circumferential surface of the shaft is usually formed having irregularities that are sized and distributed in such a manner as to adversely affect the ability of the annular seal assembly to prevent leakage therethrough. When this occurs, the shaft is said to possess a preferential lead. A preferential lead present when the irregularities formed on the outer circumferential surface of the shaft are arranged in such a manner as to draw or pump liquid past the engaging surfaces of the shaft and the annular seal assembly when the shaft is moved during use, similar to a helical thread being formed in the outer circumferential surface of the shaft.

Traditionally, the solution to the presence of a preferential lead on a shaft has been to test the shaft to determine if such a preferential lead exists and, if so, determine the direction of such preferential lead (i.e., from left end to right end or right end to left end). If the shaft possesses a preferential lead of sufficient magnitude, then it must be installed in the device in an orientation that causes the preferential lead to draw or pump liquid back within the housing when the shaft is moved during use. Otherwise, it is likely that leakage will occur through the annular seal assembly during use. On the other hand, if the shaft possesses no preferential lead (or a sufficiently small preferential lead), then it can be installed in the device in either orientation relative to the housing and the annular seal assembly. Although effective, this testing procedure has been found to be time consuming and inefficient. Thus, it would be desirable to provide an improved structure and method of manufacturing an outer surface of such a shaft that avoids the creation of a preferential lead and thereby minimizes leakage through the annular seal assembly when such shaft is rotated or otherwise moved relative thereto during use.

SUMMARY OF THE INVENTION

This invention relates to an improved structure and method of manufacturing an outer surface of such a shaft that avoids the creation of a preferential lead and thereby minimizes leakage through the annular seal assembly when such shaft is rotated or otherwise moved relative thereto during use. The outer circumferential surface of the shaft is formed having a plurality of relatively small irregularities that are evenly distributed thereabout. Such irregularities may be defined by relatively higher portions and relatively lower portions that are formed in an intersecting, cross hatched pattern or in a circumferentially extending undulating or oscillating pattern. To form the cross hatched pattern, an apparatus can be operated to engage the outer circumferential surface of the shaft in two sequential passes in opposite axial directions while the shaft is being rotated. To form the undulating pattern, an apparatus can be operated to engage the outer circumferential surface of the shaft in an axially reciprocating manner while the shaft is being rotated. By varying the feed rate of the apparatus, the rotational speed of the shaft, and the magnitude of the force applied by the apparatus against the outer circumferential surface of the shaft, the size, shape, and depth of the surface irregularities can be varied as desired.

Various objects and advantages of this invention will become apparent to those skilled in the art from the following detailed description of the preferred embodiments, when read in light of the accompanying drawings.

BRIEF DESCRIPTION OF THE DRAWINGS

FIG. 2 is a greatly enlarged plan view of a portion of the outer circumferential surface of the shaft illustrated in FIG. 1 in accordance with a first embodiment of this invention.

FIG. 3 is a greatly enlarged plan view of a portion of the outer circumferential surface of the shaft illustrated in FIG. 1 in accordance with a second embodiment of this invention.

FIG. 4 is a greatly enlarged plan view of a portion of the outer circumferential surface of the shaft illustrated in FIG. 1 in accordance with a third embodiment of this invention.

FIG. 5 is a greatly enlarged plan view of a portion of the outer circumferential surface of the shaft illustrated in FIG. 1 in accordance with a fourth embodiment of this invention.

FIG. 6 is a greatly enlarged plan view of a portion of the outer circumferential surface of the shaft illustrated in FIG. 1 in accordance with a fifth embodiment of this invention.

DETAILED DESCRIPTION OF THE PREFERRED EMBODIMENTS

Figure 1:
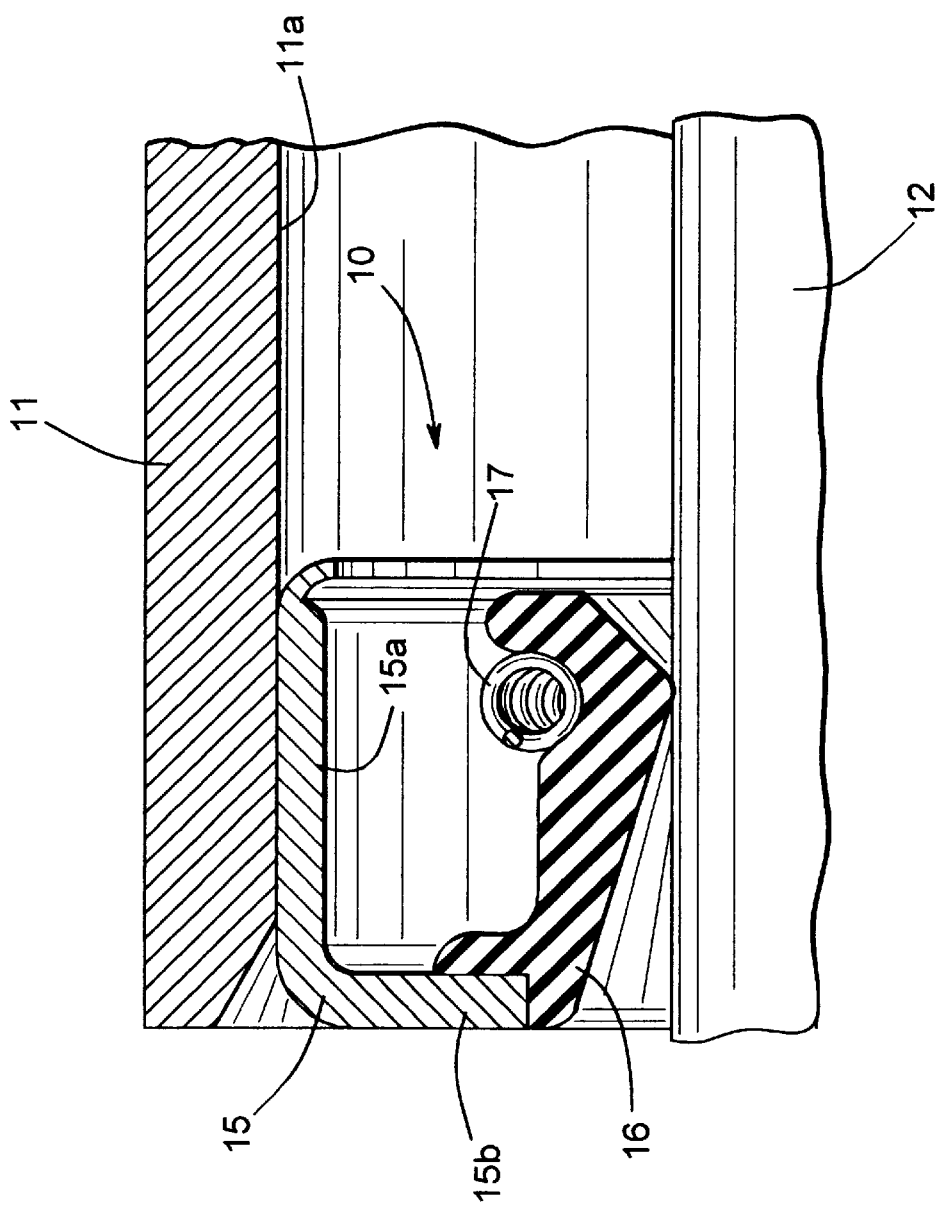
FIG. 1 is a sectional elevational of a portion of an annular seal assembly mounted in a housing of a device and having a rotatable shaft extending therethrough in accordance with this invention.

Referring now to the drawings, there is illustrated in FIG. 1 an annular seal assembly, indicated generally at 10, for providing a seal between a housing 11 and a rotatable shaft 12. The housing 11 is intended to be representative of any machine or mechanism having an opening 11a through which at least a portion of the shaft 12 extends and is rotated or otherwise moved relative thereto during use. The shaft 12 may be solid as illustrated or may be hollow, as described below. The annular seal assembly 10 includes an outer annular case 15 that is typically formed from a metallic or otherwise rigid material. In the illustrated embodiment, the case 15 is generally L-shaped in cross section, having an axially extending portion 15a and a radially extending portion 15b. However, the case 15 may be formed having any desired shape or configuration. The outer diameter defined by the axially extending portion 15a of the case 15 is usually sized to be slightly larger that the inner diameter defined by the opening 11a such that the case 15 can be installed within the opening 11a formed through the housing 11 in a press fit relationship. The radially extending portion 15b of the case 15 extends radially inwardly and terminates at a location that is spaced apart from the outer circumferential surface of the shaft 12.

The annular seal assembly 10 also includes an inner annular sealing element 16 that is usually secured to the radially extending portion 15b of the case 15, such as by an adhesive. The sealing element 16 is typically formed from a flexible material, such as an elastomeric material, and includes a portion that extends radially inwardly into engagement with the outer circumferential surface of the shaft 12. If desired, an annular garter spring 17 or other biasing mechanism can be provided to positively urge the portion of the sealing element 16 radially inwardly into engagement with the outer circumferential surface of the shaft 12.

The annular seal assembly 10 is designed to prevent a fluid (such as oil) from passing axially therethrough from one side thereof (typically the right side when viewing FIG. 1) to the other side thereof (typically the left side when viewing FIG. 1) as the shaft 12 is rotated or otherwise moved relative to the housing 11 and the annular seal assembly 10 during use. To accomplish this, the radially inwardly extending portion of the sealing element 16 engages the outer circumferential surface of the shaft 12. Ideally, as discussed above, the outer circumferential surface of the shaft would be formed having a plurality of relatively small irregularities that are evenly distributed thereabout. The presence of these irregularities is desirable because small amounts of lubricant are trapped therein during use. The trapped lubricant reduces the amount of friction between the outer circumferential surface of the shaft and the flexible lip portion of the resilient inner seal engaged therewith. So long as such surface irregularities are relatively small in size and sufficiently evenly distributed across the outer circumferential surface of the shaft, then their presence will not form a preferential lead that is likely to adversely affect the operation of the annular seal assembly. This invention contemplates a specific structure for the outer circumferential surface of the shaft 12, and a method of manufacturing same, that positively insures that a plurality of relatively small irregularities are formed therein and are evenly distributed thereabout so as to either (1) prevent the formation of a preferential lead or (2) insure that a preferential lead is formed in a predetermined direction on the shaft 12.

The structure of a first embodiment of the outer circumferential surface of the shaft 12 is illustrated in FIG. 2. As shown therein, the outer surface of the shaft 12 is formed having a plurality of surface irregularities that are defined by relatively higher portions (indicated by the dark portions 20) and relatively lower portions (indicated by the light portions 21). In this embodiment, the higher portions 20 and the lower portions 21 are formed in an intersecting, cross hatched pattern. The higher portions in this embodiment are relatively small in width and relatively small in height in comparison with the lower portions 21, resulting in a cross hatched pattern having a relatively light density. Also, in this embodiment, the higher portions are oriented at a relatively large angle relative to the axis of rotation A of the shaft 12.

The structure of a second embodiment of the outer circumferential surface of the shaft 12 is illustrated in FIG.

3. As shown therein, the outer surface of the shaft 12 is formed having a plurality of surface irregularities that are defined by relatively higher portions (indicated by the dark portions 30) and relatively lower portions (indicated by the light portions 31). In this embodiment, the higher portions 30 and the lower portions 31 are formed in an intersecting, cross hatched pattern. The higher portions 30 in this embodiment are relatively small in width and relatively small in height in comparison with the lower portions 31, resulting in a cross hatched pattern having a relatively light density. Also, in this embodiment, the higher portions 30 are oriented at a relatively small angle relative to the axis of rotation A of the shaft 12.

The structure of a third embodiment of the outer circumferential surface of the shaft 12 is illustrated in FIG. 4. As shown therein, the outer surface of the shaft 12 is formed having a plurality of surface irregularities that are defined by relatively higher portions (indicated by the dark portions 40) and relatively lower portions (indicated by the light portions 41). In this embodiment, the higher portions 40 and the lower portions 41 are formed in an intersecting, cross hatched pattern. The higher portions 40 in this embodiment are relatively large in width and relatively large in height in comparison with the lower portions 41, resulting in a cross hatched pattern having a relatively heavy density. Also, in this embodiment, the higher portions 40 are oriented at a relatively large angle relative to the axis of rotation A of the shaft 12.

The structure of a fourth embodiment of the outer circumferential surface of the shaft 12 is illustrated in FIG. 5. As shown therein, the outer surface of the shaft 12 is formed having a plurality of surface irregularities that are defined by relatively higher portions (indicated by the dark portions 50) and relatively lower portions (indicated by the light portions 51). In this embodiment, the higher portions 50 and the lower portions 51 are formed in an intersecting, cross hatched pattern. The higher portions 50 in this embodiment are relatively small in width and relatively large in height in comparison with the lower portions 51, resulting in a cross hatched pattern having a relatively light density. Also, in this embodiment, the higher portions 50 are oriented at a relatively large angle relative to the axis of rotation A of the shaft 12.

The structure of a fifth embodiment of the outer circumferential surface of the shaft 12 is illustrated in FIG. 6. As shown therein, the outer surface of the shaft 12 is formed having a plurality of surface irregularities that are defined by relatively higher portions (indicated by the dark portions 60) and relatively lower portions (indicated by the light portions 61). In this embodiment, the higher portions 60 and the lower portions 61 are formed in an oscillating or undulating pattern that extends generally circumferentially about the shaft 12. The higher portions 60 in this embodiment are relatively small in width and relatively small in height in comparison with the lower portions 61, resulting in an undulating pattern having a relatively heavy density.

The above embodiments of the outer circumferential surface of the shaft 12 are intended to be representative of any desired arrangement of the surface irregularities that positively prevents the formation of a preferential lead when the shaft 12 is moved during use. The specific sizes, shapes, and distributions of such surface irregularities can be varied as desired in accordance with the specific needs of the particular application. Factors that may affect the optimum sizes, shapes, and distributions of these surface irregularities may include shaft diameter, shaft speed, eccentricity, shaft-to-bore misalignment, dynamic run-out, and the like. By way of example, the angles at which the relatively higher portions of the cross hatched embodiments described above extend relative to the axis of rotation of the shaft 12 can vary from about 0.05 degree to about 0.30 degree. Also, the height of the relatively higher portions and the depth of the relatively lower portions can also be varied as desired in accordance with the specific needs of the particular application. For example, the relative height and/or depth of such portions can vary from about an Rvk value of from about 3.0 micro-inches to about 40.0 micro-inches. If desired, a self-lubricating coating can be provided on the outer surface of the shaft 12 in combination with the relatively higher portions and relatively lower portions.

The formation of the above-described irregularities in the outer circumferential surface of the shaft 12 can be accomplished in any desired manner. For the sake of illustration, such formation will be described in the context of a slip yoke, indicated generally at 70 in FIG. 7. The slip yoke 70 includes a generally hollow cylindrical body portion 71 having an outer circumferential surface 72 and an internally splined inner surface 73. The slip yoke 70 further includes a yoke portion 74 having a pair of arms 75 and 76 extending therefrom. The arms 75 and 76 of the yoke portion 74 having respective aligned openings 75a and 76a formed therethrough that are adapted to receive portions of a universal joint therein in a known manner. Although this invention will be described in the context of the illustrated slip yoke 70, it will be appreciated that this invention is not limited thereto, but rather may be practiced on any surface that is adapted to be engaged by the seal assembly 10 during use.

Figure 7:
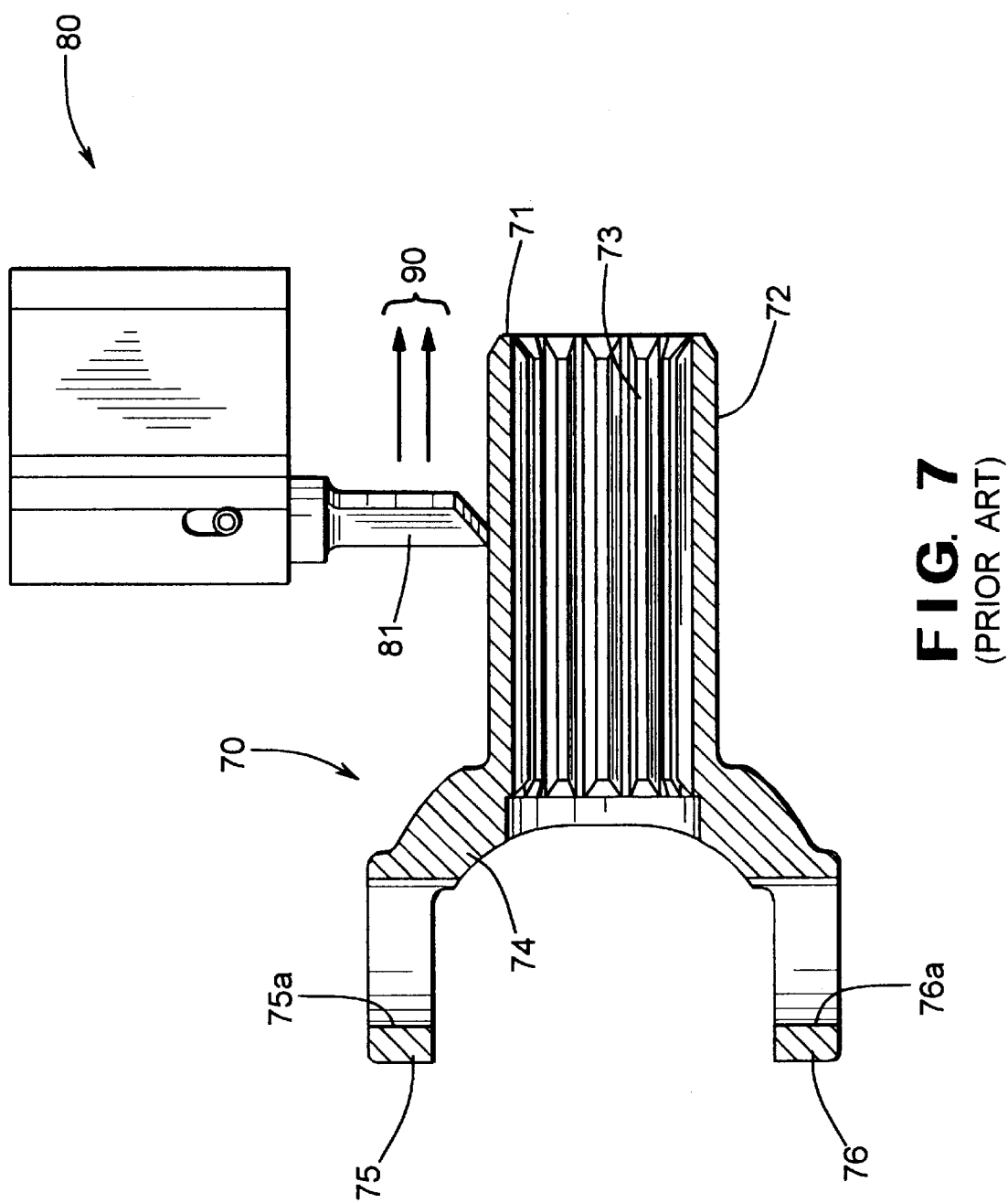
FIG. 7 is a schematic side elevational view, partially in cross section, of an apparatus for forming the outer circumferential surface of a body portion of a slip yoke in accordance with a prior art method.

FIG. 7 further schematically illustrates an apparatus, indicated generally at 80, for engaging the outer circumferential surface 72 of the slip yoke 70 to form the irregularities in the outer circumferential surface 72 thereof. The illustrated apparatus 80 is intended to be representative of any machine that function in the manner described below to form the such surface irregularities. For example, the apparatus 80 can include a tool 81 or other structure that is adapted to engage and re-shape the outer circumferential surface 72 of the slip yoke 70, either with or without the removal of material therefrom. In the illustrated embodiment, the apparatus 80 is a turning apparatus containing a cutting tool 81 that is designed to remove material from the outer circumferential surface 72 of the slip yoke 70 to provide a generally smooth surface that can be engaged by the annular seal assembly 10. However, it will be appreciated that the outer circumferential surface 72 of the slip yoke 70 may be shaped in any other desired manner, such as by mechanical deformation or laser surface modification techniques.

FIG. 7 illustrates the manner in which the apparatus 80 has been typically operated in the past to engage and re-shape the outer circumferential surface 72 of the slip yoke 70. As indicated by the two arrows 90, the apparatus 80 has traditionally been operated to engage the cutting tool 81 with the outer circumferential surface 72 of the slip yoke 70 in two sequential passes in the same axial direction while the slip yoke 70 was being rotated. During the first pass, the cutting tool 81 of the apparatus 80 engaged the outer circumferential surface 72 of the slip yoke 70 and was moved in a first axial direction (from left to right, for example, when viewing FIG. 7) to perform a rough turning operation. Then, the cutting tool 81 was removed from the outer circumferential surface 72 of the slip yoke 70 and returned to its original position. Lastly, during the second pass, the cutting tool 81 of the apparatus 80 again engaged the outer circumferential surface 72 of the slip yoke 70 and was again moved in the first axial direction (from left to right, for example, when viewing FIG. 7) to perform a finish turning operation. The manufacture of the outer circumferential surface 72 of the slip yoke 70 in this manner has been found to create an undesirable preferential lead in the outer circumferential surface thereof.

Figure 8:
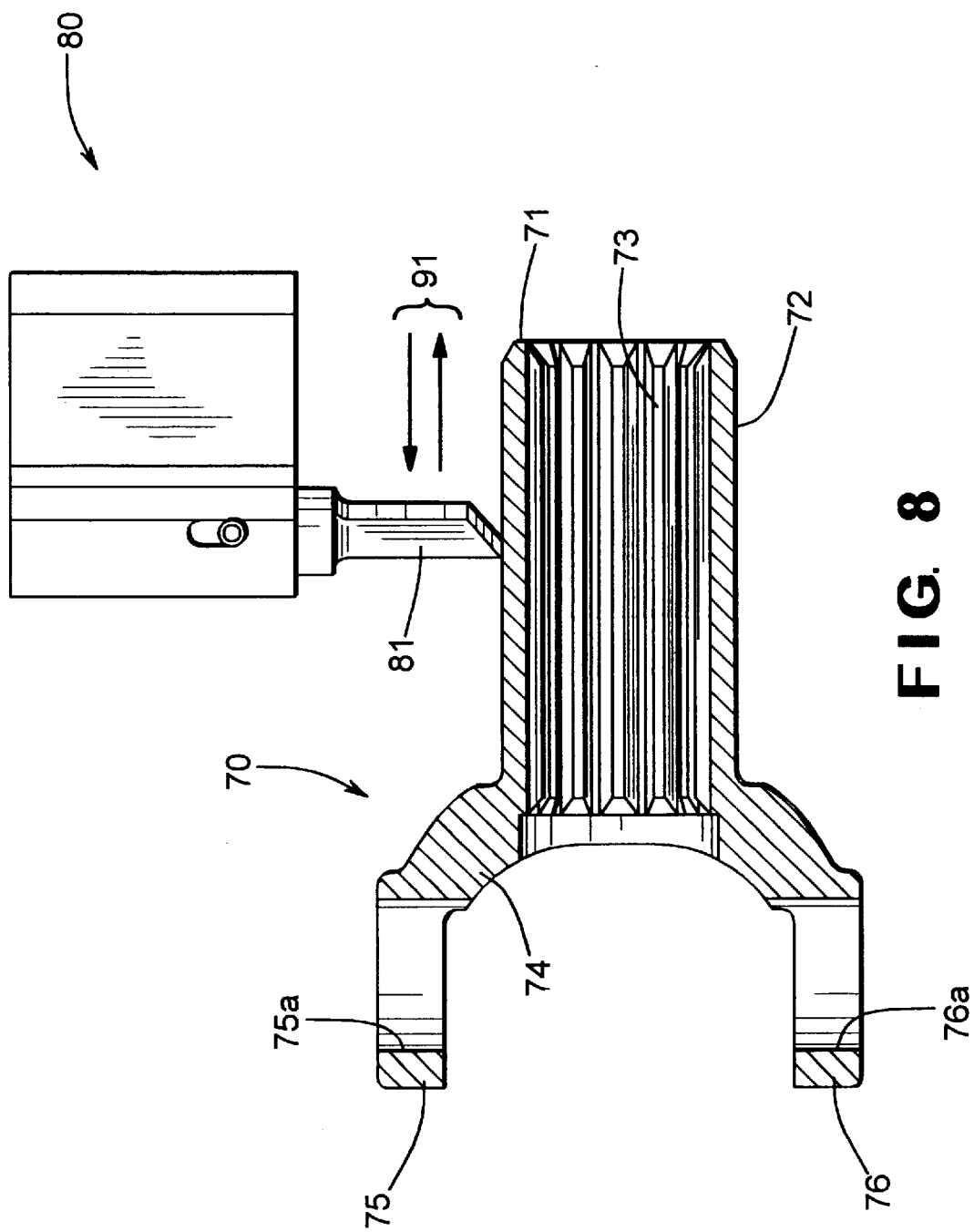
FIG. 8 is a schematic side elevational view, partially in cross section, of an apparatus for forming the outer circumferential surface of a body portion of a slip yoke in accordance with the embodiments of this invention illustrated in FIGS. 2 through 5.

FIG. 8 illustrates a first manner in which the apparatus 80 can be operated in accordance with this invention to engage and re-shape the outer circumferential surface 72 of the slip yoke 70 to have any of the cross hatched surface irregularities illustrated in FIGS. 2 through 5. As indicated by the two arrows 91, the apparatus 80 is operated to engage the cutting tool 81 with the outer circumferential surface 72 of the slip yoke 70 in two sequential passes, but in opposite axial directions, while the slip yoke 70 is being rotated. During the first pass, the cutting tool 81 of the apparatus 80 engages the outer circumferential surface 72 of the slip yoke 70 and is moved in a first axial direction (from left to right, for example, when viewing FIG. 7) to perform a rough turning operation. Then, during the second pass, the cutting tool 81 of the apparatus 80 engages the outer circumferential surface 72 of the slip yoke 70 and is moved in a second axial direction (from right to left, for example, when viewing FIG. 7) to perform a finish turning operation. By varying the feed rate of the cutting tool 81, the rotational speed of the slip yoke 70, and the magnitude of the force applied by the cutting tool 81 against the outer circumferential surface 72, the size, shape, and depth of the surface irregularities can be varied as desired.

Figure 9:
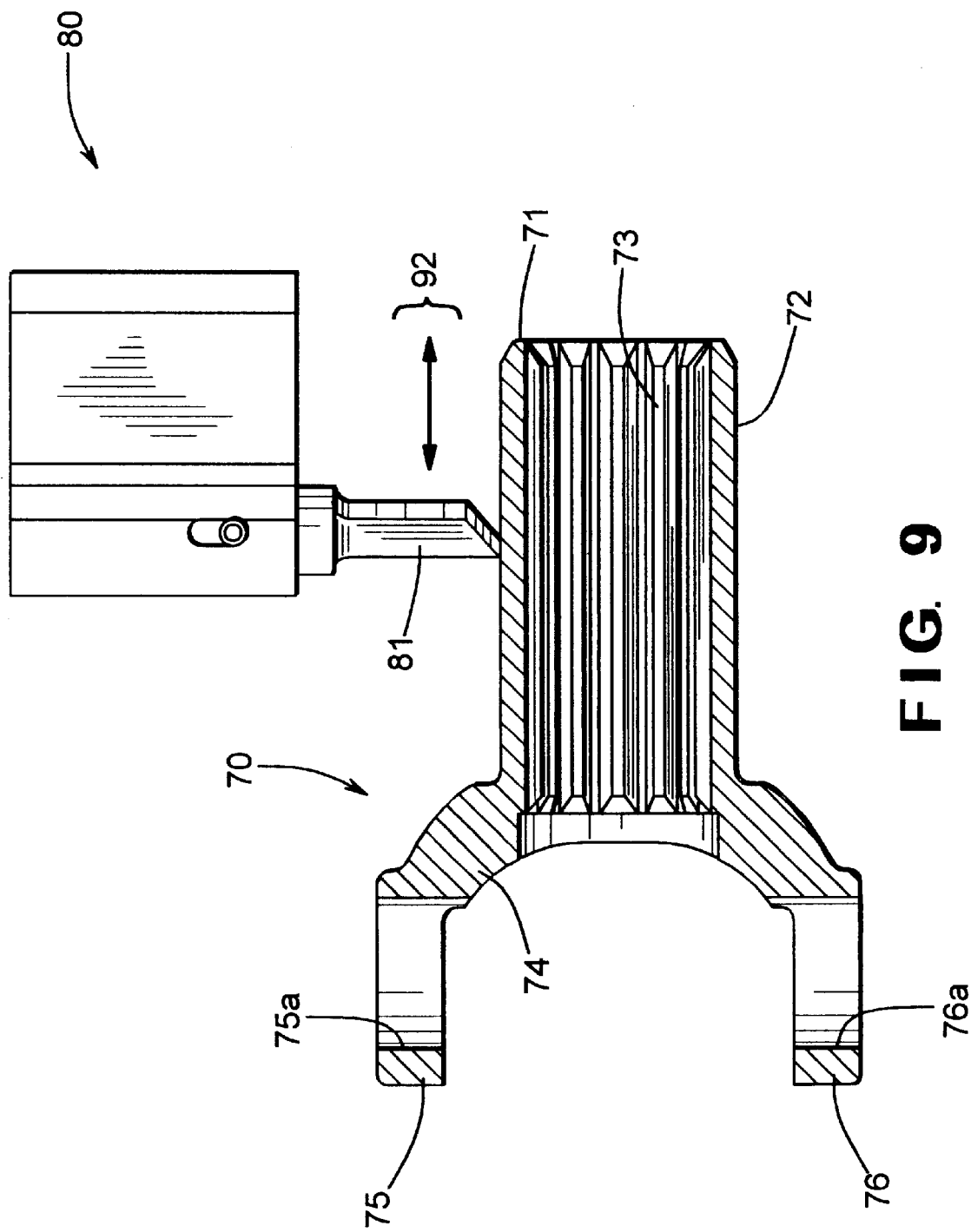
FIG. 9 is a schematic side elevational view, partially in cross section, of an apparatus for forming the outer circumferential surface of a body portion of a slip yoke in accordance with the embodiments of this invention illustrated in FIG. 6.

FIG. 9 illustrates a second manner in which the apparatus 80 can be operated in accordance with this invention to engage and re-shape the outer circumferential surface 72 of the slip yoke 70 to have the undulating surface irregularities illustrated in FIG. 6. As indicated by the arrow 92, the apparatus 80 is operated to engage the cutting tool 81 with the outer circumferential surface 72 of the slip yoke 70 in an axially reciprocating manner while the slip yoke 70 is being rotated. The size, shape, and depth of the surface irregularities can be varied as desired in a manner similar to that described above.

The various surface irregularity patterns illustrated in FIGS. 2 through 6 are designed to provide no preferential lead in the outer circumferential surface of the shaft 12. Such a shaft 12 would be desirable for use in any application, but would be particularly useful in those situations where rotation of the shaft 12 is bi-directional. Nonetheless, it will be appreciated that the above-described methods can be adapted to form a preferential lead of predetermined direction in the outer circumferential surface of the shaft 12. Such a preferential lead can be formed by varying the feed rate of the cutting tool 81 or the rotational speed of the slip yoke 70 between the two passes. The formation of a preferential lead would be useful where the shaft 12 is to be used in uni-directional applications. Furthermore, because the manufacturing process is controlled to form the preferential lead in a predetermined direction in the outer circumferential surface of the shaft 12, subsequent testing of the shaft 12 as described above is rendered unnecessary.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A combined shaft and seal assembly comprising:
    a shaft having an outer surface having a plurality of relatively small irregularities formed thereon; and
    a seal assembly disposed about said shaft and having a flexible portion that resiliently engages said outer surface of said shaft to prevent leakage therethrough, said plurality of relatively small irregularities being arranged on the outer circumferential surface of the shaft in such a manner as to prevent liquid from being drawn or pumped past the engaging surfaces of said shaft and said seal assembly when said shaft is moved during use, said surface irregularities being formed in one of an intersecting, cross hatched pattern or a circumferentially extending undulating pattern.

2. The combined shaft and seal assembly defined in claim 1 wherein said shaft defines an outer diameter, and wherein said surface irregularities are defined by higher portions that extend above said outer diameter and lower portions that extend below said outer diameter.

3. The combined shaft and seal assembly defined in claim 2 wherein said surface irregularities are formed in an intersecting, cross hatched pattern.

4. The combined shaft and seal assembly defined in claim 2 wherein said surface irregularities are formed in a circumferentially extending undulating pattern.

5. A method of manufacturing a combined shaft and seal assembly comprising the steps of:
    (a) providing a shaft having an outer surface;
    (b) forming a plurality of relatively small irregularities in the outer surface of the shaft in one of an intersecting, cross hatched pattern or a circumferentially extending undulating pattern; and
    (c) disposing a seal assembly about the shaft such that a flexible portion thereof resiliently engages the outer surface of the shaft in such a manner as to prevent liquid from being drawn or pumped past the engaging surfaces of said shaft and said seal assembly when said shaft is moved during use.

6. The method defined in claim 5 wherein said step (a) is performed by providing a shaft having an outer surface that defines an outer diameter, and wherein said step (b) is performed by forming higher portions that extend above the outer diameter and lower portions that extend below the outer diameter in the outer surface of the shaft.

7. The method defined in claim 6 wherein said step (b) is performed by forming the surface irregularities in an intersecting, cross hatched pattern.

8. The method defined in claim 6 wherein said step (b) is performed by forming the surface irregularities in a circumferentially undulating pattern.

9. The method defined in claim 5 wherein said step (b) is performed by causing an apparatus to engage the outer circumferential surface of the shaft in two sequential passes in opposite axial directions while the shaft is being rotated.

10. The method defined in claim 5 wherein said step (b) is performed by causing an apparatus to engage the outer circumferential surface of the shaft in an axially reciprocating manner while the shaft is being rotated.

11. A method of manufacturing a combined shaft and seal assembly comprising the steps of:
    (a) providing a shaft having an outer surface;
    (b) forming a plurality of relatively small irregularities in the outer surface of the shaft by causing an apparatus to engage the outer circumferential surface of the shaft in one of (1) two sequential passes in opposite axial directions while the shaft is being rotated and (2) an axially reciprocating manner while the shaft is being rotated; and
    (c) disposing a seal assembly about the shaft such that a flexible portion thereof resiliently engages the outer surface of the shaft in such a manner as to prevent liquid from being drawn or pumped past the engaging surfaces of said shaft and said seal assembly when said shaft is moved during use.

12. The method defined in claim 11 wherein said step (b) is performed by causing the apparatus to engage the outer circumferential surface of the shaft in two sequential passes in opposite axial directions while the shaft is being rotated.

13. The method defined in claim 11 wherein said step (b) is performed by causing the apparatus to engage the outer circumferential surface of the shaft in an axially reciprocating manner while the shaft is being rotated.

14. The method defined in claim 11 wherein said step (b) is performed by forming a plurality of relatively small irregularities in the outer surface of the shaft in an intersecting, cross hatched pattern.

15. The method defined in claim 11 wherein said step (b) is performed by forming a plurality of relatively small irregularities in the outer surface of the shaft in a circumferentially extending undulating pattern.

* * * * *